United States Patent Office 3,833,693
Patented Sept. 3, 1974

3,833,693
DISPENSING OF A MATERIAL INTO A MOULD
Keith Ross, Sheffield, England, assignor to Go-Con Concrete Limited, London, England
Filed May 21, 1971, Ser. No. 145,649
Claims priority, application Great Britain, May 26, 1970, 25,166/70
Int. Cl. B28b 13/02, 17/00
U.S. Cl. 264—40  5 Claims

ABSTRACT OF THE DISCLOSURE

To dispense flowable material, such as wet concrete, into an open topped mould from a reservoir having a plurality of separately controllable outlets arranged side-by-side in line, the mould and the outlets are positioned with the outlets above a datum at one end of the mould and relative movement is caused to take place between the outlets and the mould in a horizontal direction normal to the line of the outlets. Signals are obtained continuously representing the position of the outlets from the datum and these signals are compared with signals on a prepared programme for the operation of the outlets. The outlets are opened and closed automatically to bring about flow of the material into the mould.

Figure 1:
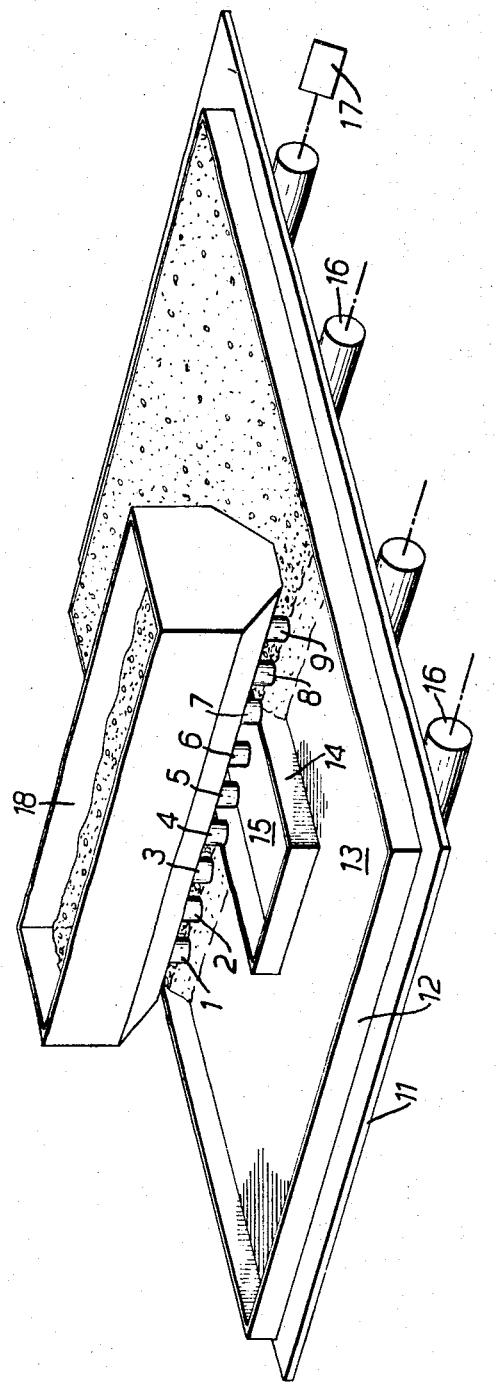

The weight of material which has been dispensed may at all times be compared with the calculated weight which should have been dispensed and the speed of displacement between the mould and the outlets is adjusted to bring about a correct rate of delivery of the material.

---

This invention relates to a method of dispensing flowable material contained in a reservoir into an open topped mould and to apparatus for automatically controlling the dispensing of the material into the mould. The flowable material is dispensed into the mould through a plurality of separately controlled outlets from the reservoir, the outlets being arranged side-by-side in line.

It is an object of the present invention to provide a method of dispensing flowable material into an open topped mould, which method ensures that the flowable material only enters into those parts of the mould where the material is required and does not enter parts of the mould where the material is not required.

Accordingly, one aspect of the invention resides in a method of dispensing flowable material from a reservoir having a plurality of separately controllable outlets arranged side-by-side in line into an open topped mould wherein the mould and the outlets are positioned so that the outlets are above a datum at one end of the mould and relative movement is caused to take place between the reservoir and the mould in a horizontal direction normal to the line of the outlets so that the mould area is swept by the line of outlets, and during the relative movement signals are obtained representative of the relative position of the outlets and said datum and said signals are automatically compared with information on a programme for the operation of said outlets to bring about automatic control of said outlets and hence the control of the flow of the material through the outlets and into the mould.

Preferably the outlets of the reservoir remain stationary and the mould is traversed horizontally beneath the outlets.

A particular, but not sole, application of the invention is to a method of filling a mould with concrete prior to pressing the concrete into a panel in a moulding press. A suitable press is disclosed in our British Patent No. 1,211,562. The programme of the sequence of opening and closing of the gates is set up to suit the size of the body to be formed in the mould on punched or magnetic tape or cards or the like. As the relative movement between the mould and the outlets takes place the signal representative of the relative position of the outlets and the datum from which operation begins is compared automatically with the information on the programme to thereby bring about automatic operation of the outlets at the appropriate time and hence the automatic control of the flow of the material through the outlets and into the required parts of the mould.

To ensure that the flowable material is evenly and uniformly dispensed into the mould it is preferable that during the time when relative movement between the outlets and the mould takes place that the actual amount of material which has been dispensed into the mould (during the filling operation) is automatically and continuously compared with a calculated amount of the flowable material which should have been dispensed at that relative position to produce an error signal which is used to automatically adjust the speed of movement between the outlets and the mould to reduce the error signal to zero. For example if the mould is being displaced relative to the outlets and it is found that material is not being dispensed at a sufficiently fast rate then the speed of displacement of the mould is slowed down to bring about correct dispensing of the material. Conversely if it is found that at any position of the mould too much material is being dispensed then the speed of the mould relative to the outlets is increased. By obtaining a uniform distribution of the material into the mould the necessity of levelling the surface of the material in the mould before the material is pressed is avoided.

According to a second aspect of the invention control apparatus for carrying out the method of the invention comprises means for bringing about horizontal relative movement between the mould and the reservoir, means for producing a signal representative of the relative position of the outlets and said datum, a programme containing information for the operation of said outlets and means for automatically comparing said signals and said information to bring about control of said outlets at the appropriate times.

Figure 2:
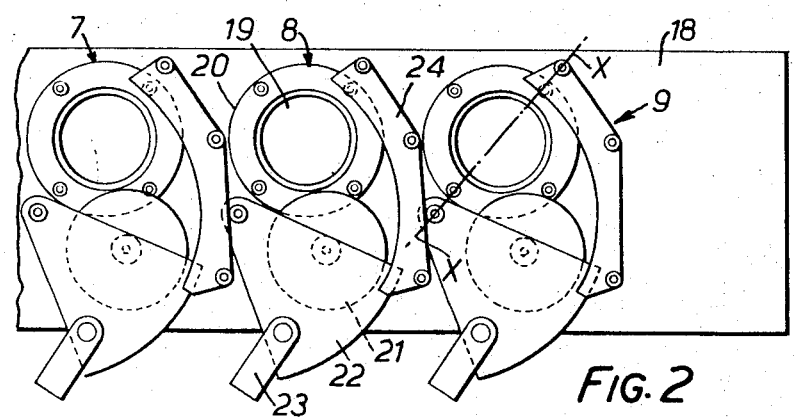
Figure 3:
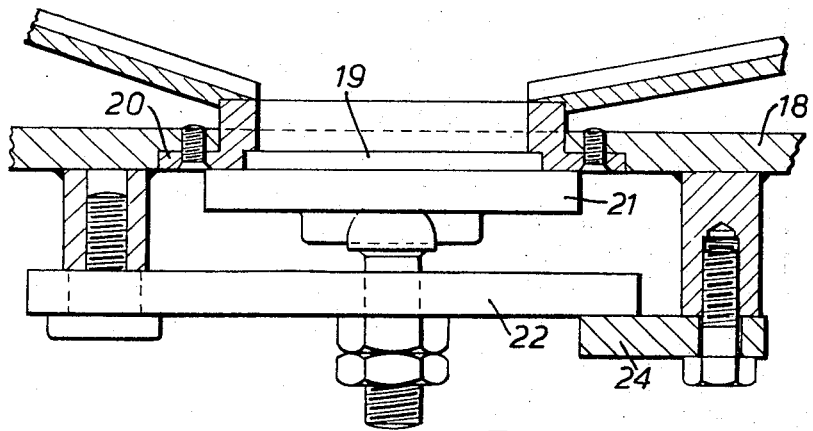
Figure 4:
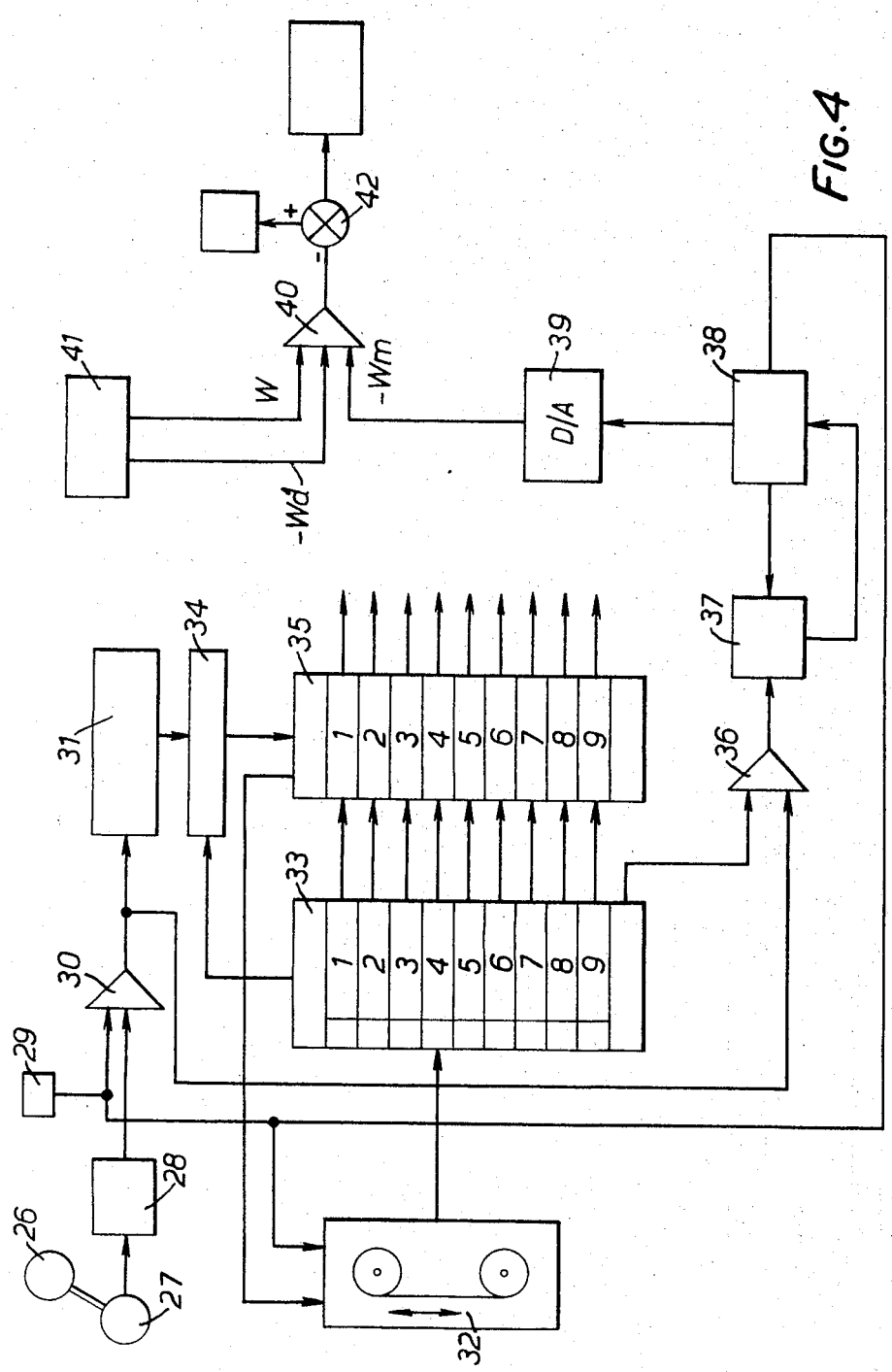
Figures 5, 6:
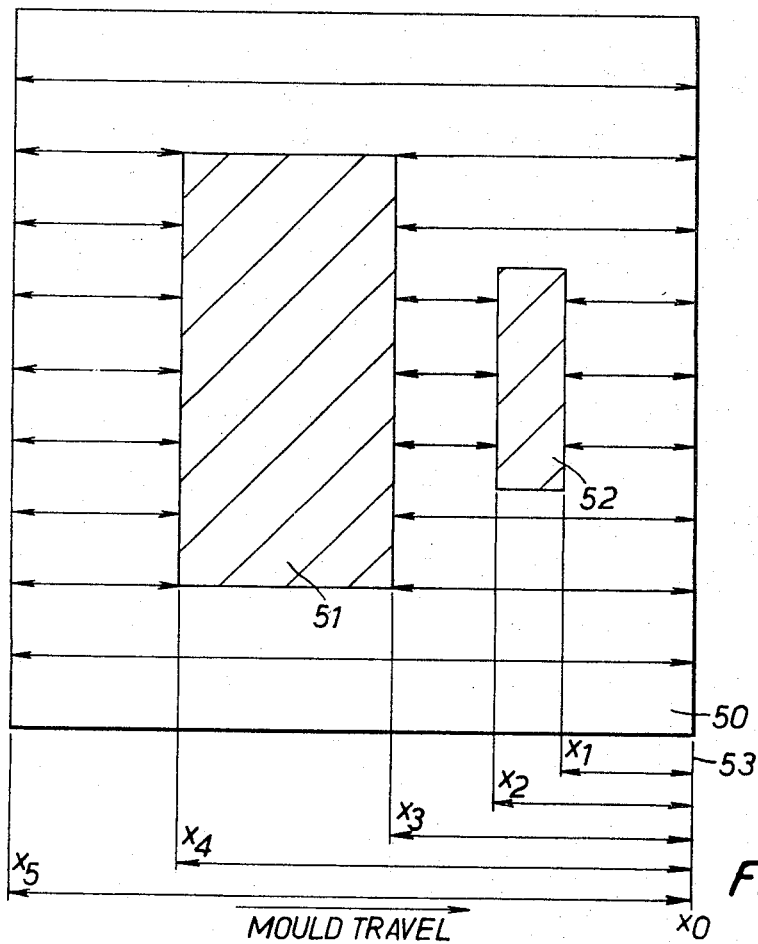

In order that the invention may be more readily understood it will now be described, by way of example only, with reference to the accompanying drawings in which:

FIG. 1 is a diagrammatic perspective view of a mould positioned beneath a multi-outlet reservoir, FIG. 2 is a view from beneath of part of the reservoir, FIG. 3 is a sectional side elevation on the line X—X of FIG. 2, FIG. 4 is a block circuit diagram of the control apparatus, FIG. 5 shows diagrammatically a typical mould filling pattern, FIG. 6 is a table of the mould filling set points of the pattern shown in FIG. 5, and FIGS. 7A to 7D show a typical mould filling pattern, the effective panel width (W), the calculated weight of concrete required for correct filling ($W_m$), and the quantity of concrete in the resorvoir awaiting discharge ($W_d$) respectively.

The invention as applied to the filling of a mould with wet concrete prior to moulding of the concrete in a moulding press will now be described.

Referring to FIG. 1, a large open mould for receiving wet concrete has a base plate 11 supporting upstanding mould walls 12 which together define a generally rectangular enclosure 13. Within the enclosure there are further mould walls 14 which define a smaller enclosure 15. The mould base is supported on a plurality of rollers 16 and drive means 17 connected to one of the rollers is provided for displacing the mould horizontally in the direction parallel to its longer sides beneath an elongate hopper 18 which serves as a reservoir for the concrete. The hopper is arranged with its longitudinal axis parallel to the shorter side walls of the mould and extends for at least the full width of the mould. A plurality of outlet gates 1–9 are spaced apart along the length of the hopper. Each outlet gate is provided with means by which the gate can be closed or opened to allow concrete contained in the hopper to be dispensed into the mould.

Referring now to FIGS. 2 and 3, the outlet gates are provided at the base of the hopper 18 and the gates are identical. Each gate consists of an opening 19 in the base of the hopper and the opening is surrounded by an annular plate 20 secured to the base of the hopper. A cut-off plate 21 is slideable across the face of the plate 20 to open and close the opening 19. The plate 21 is supported from an arm 22 which is pivotally mounted with respect to the hopper. The connecting rod 23 of a piston-cylinder device (not shown) is connected to the arm 22 so that by operating the piston-cylinder device the arm is pivoted between the two positions in which the opening 19 is covered and uncovered respectively by the cut-off plate 21. One edge of the arm 22 is supported by a guide 24 spaced below the base of the hopper.

Referring now to FIG. 4, a roller 26 associated with the mould base 11 is connected to a pulse generator 27 which produces a pulse for unit displacement, say one pulse per centimetre, of the mould base. The pulses from the generator are applied through a logic circuit 28 to one input of a gate 30. A proximity switch 29 supplies pulses to another input of gate 30 when the leading end of the mould approaches the reservoir 18. When the gate 30 is open the pulses from the generator 27 are applied to a counter 31.

Pre-recorded instructions for the operation of the outlet gates 1–9 on the reservoir are provided for each type of mould in use on magnetic tape which is fed to a tape reader 32 and for a particular mould the reader supplies signals in accordance with the information supplied to it to a tape storage register 33. Signals from the tape storage register 33 are supplied to a comparator 34 which also receives signals from the counter 31. The individual outlets 1–9 of the reservoir have individual memories 35 which receive signals from the register 33 and the memories are connected through valves (not shown) to the individual fluid operated piston-cylinder devices associated with the plates 22 on the outlet gates of the hopper.

Output signals from the gate 30 are supplied to one input of a gate 36 as is a signal from the tape storage register 33. The output from gate 36 is connected though an adder 37 to a mould weight counter 38 which is zeroed by a signal from the proximity switch 29. Output signals from the counter 38 are passed through a digital-analogue converter 39 and on to one input of an adder 40 along with signals from a weighing device 41 associated with the hopper 18. The output from the adder 40 is compared in a comparator 42 with a speed reference signal and the comparison signal is supplied to the mould traverse drive.

FIG. 5 shows a plan of a mould enclosure 50 having two cut-out enclosures 51 and 52. The position of the enclosures with respect to the leading reference edge 53 of the mould are indicated. The position of the outlet gates 1–9 of the hopper are also shown. It can be seen that as the mould travels beneath the hopper:

Gates 1 and 9 remain fully open between positions X0 and X5.

Gates 2, 3, 7 and 8 remain fully open between positions X0 and X3, are closed between positions X3 and X4 and are reopened between positions X4 and X5.

Gates 4, 5 and 6 are open between positions X0 and X1, are closed between positions X1 and X2, open between X2 and X3, closed between X3 and X4 and finally open between X4 and X5.

Before automatic filling can take place, the required mould filling pattern for the particular slab to be cast must first be calculated. Reference to FIG. 5 shows that the various gates must be opened and closed at various positions along the mould length. The various positions corresponding to changes in mould width may be defined as "set-points." A series of set-points is therefore calculated according to the desired filling pattern. For the example shown in FIG. 5, the operation of the gates 1–9 as indicated in FIG. 6 would be produced.

Each set-point consists of a 3-digit number, being the number of centimetres of mould displacement from the initiation point. The contents of the traverse counter 31 is continuously compared by means of the digital comparator 34. When coincidence of the counter and a particular set-point is reached, control circuits operate so as to open or close the particular discharge gates. Once the discharge gate memories 35 have been set, a new set of tape instructions for the next set-point along the mould can be loaded into the tape storage register 33 from the tape reader. As soon as the coincidence for this new set-point is reached, the memories and the gates are reset accordingly. In this manner, a mould can be accurately filled with concrete regardless of its shape or size.

Furthermore, accurate dispensation of concrete eliminates the need for levelling within the mould, so reducing the overall mould filling time. To ensure that the dispensation of the concrete is uniform it is necessary to continuously adjust the speed of the mould as it passes beneath the outlet gates of the hopper. As the mould passes beyond the initiating proximity switch 29, the accumulative required volume of concrete is computed by means of electronic circuits in accordance with the effective panel width, the mould displacement and the required panel thickness. Knowing the equivalent concrete density, a measure of the weight of concrete that should have been dispensed into the mould for correct filling, can be computed.

Let
$$W - W_d - W_m = \text{Error signal}$$
where:

$W$ = the total weight of concrete to be dispensed for a particular panel $W_d$ = the weight of concrete remaining in the hopper at any time $W_m$ = the calculated weight of concrete that should have been dispensed into the mould for correct filling at that time.

Should the calculated weight of concrete at any instance be greater than that weight of concrete which has actually been dispensed into the mould, then an error signal is produced from the computing circuit 40. This error signal is then used to slow down the mould traverse speed so that zero error signal is achieved.

Conversely, if the computer mould weight is less than the amount of concrete actually dispensed from the remixer, the mould traverse speed is increased accordingly.

Between X3 and X4, where among others, gates 2 and 8 are closed, gates 1 and 9 have to discharge concrete equivalent to approximately 1½ gates. For a given gate discharge rate therefore, the mould must be traversed at a lower speed. Beyond X4, the speed will be increased to accommodate the full discharge rate from the nine gates. It can be seen therefore, that the mould passes beneath the hopper, the speed must be varied in accordance with the panel cut-outs and gate discharge.

Figure 7:
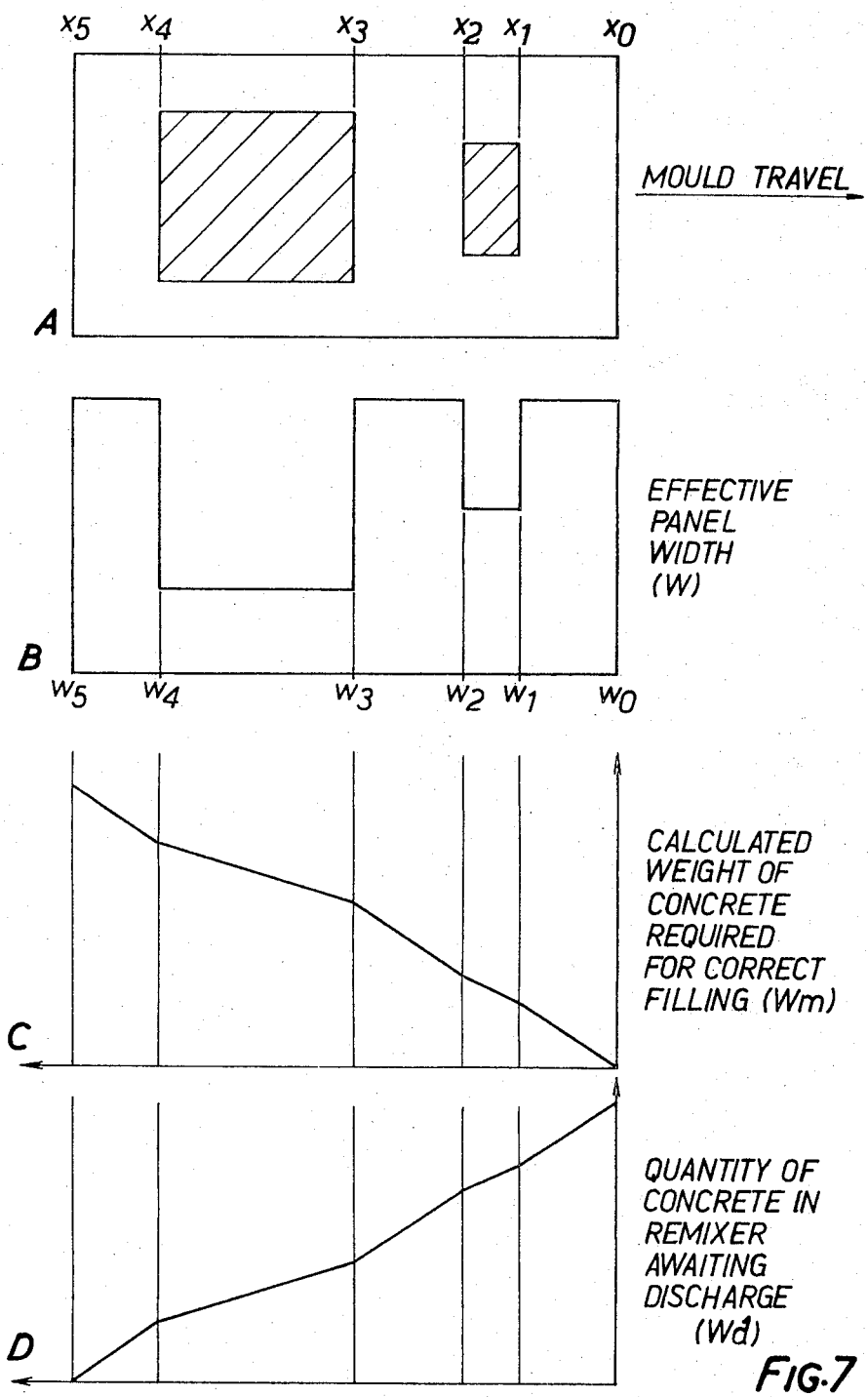

A typical mould pattern is shown in FIG. 7A and FIG. 7B shows the effective width of the panel at various points along its length. The calculated weight of concrete required for correct filling is shown in FIG. 7C. To calculate this value the effective panel width has to be integrated along the length of the mould so as to produce a measure of "swept area." A signal proportional to this value is then multiplied by the rates $d/P$ where $d$ is the depth of wet concrete required in the mould and $P$ is the density of the concrete.

This gives the weight of concrete that should be dispensed for correct filling of the mould.

Referring again to FIG. 4, the output of register 38 feeds both the converter 39 and one input of the adder 37. The second input to the adder is initially derived from the panel width $W_0$ corresponding to set-point $X_0$. The first traverse pulse after initiation of mould filling is used to apply the panel width $W_0$ to the adder by way of input gate 36. For each subsequent traverse pulse, the panel width is added to the contents of the register. This successive addition therefore calculates the effective panel area as the mould is traversed beneath the hopper. The contents of the register 38 are converted to an analogue signal in the converter 39 and the signal is representative of $-W_m$.

A signal representative of the predetermined total weight of concrete W is applied to the adder 40 along with a signal representative of $-W_d$ from a weighing device associated with the hopper 18, and the signal $-W_m$. These signals are summed together in the adder 40 to produce the error signal. The error signal, if not zero, modifies a preset speed reference signal to adjust the traverse speed of the mould in order to reduce the error signal to zero.

I claim:

1. A method of dispensing wet concrete from a reservoir into an open-topped mould having a cavity of substantially uniform depth and with at least one area cut off from the remainder of the cavity and into which area concrete is not to be dispensed, said reservoir having a plurality of outlets arranged side-by-side in line and each actuatable between an open and a closed condition independently of the others, wherein the outlets in their closed condition and the mould are positioned so that the outlets are above one end of the mould, relative movement is caused to take place between the outlets of the reservoir and the mould in a single horizontal direction normal to the line of the outlets so that the mould cavity is swept by the line of outlets, and during the relative movement electrical signals are obtained which are representative of the relative position of the outlets and said end of the mould, and for each outlet the signals are automatically compared with signals supplied from a previously prepared instruction storage register relating to the opening and closing of each outlet as its distance from the end of the mould varies, and on coincidence of said compared signals the stored signals supplied from the storage register are employed to bring about the opening of those outlets as determined by the stored instructions when they are above the area of the mould cavity in which the concrete is required, and the closing of those outlets as determined by the stored instruction when they are above that area of the cavity into whch concrete is not to be dispensed.

2. A method as claimed in claim 1 in which the outlets remain stationary and the mould is traversed horizontally beneath the outlets.

3. A method as claimed in claim 2 in which said signals are in the form of pulses, each pulse representing unit displacement of the mould.

4. A method as claimed in claim 1 wherein during the relative movement of the mould and outlets the weight of wet concrete which has been displaced is continuously compared with the calculated weight of flowable material which should have been dispensed to produce an error signal and said signal is employed to control the speed of relative movement of the outlets and nozzles to reduce said error signal substantially to zero.

5. A method as claimed in claim 4 wherein a positive signal representative of the total weight of wet concrete to be dispensed (W), a negative signal representative of the weight of wet concrete present in the reservoir ($W_d$) and a negative signal representative of the weight of wet concrete which should have been dispensed ($W_m$) are added together to solve the equation error $$E = W - W_d - W_m.$$

References Cited

UNITED STATES PATENTS

| | | | |
|---|---|---|---|
| 1,700,405 | 1/1929 | Guidi | 222—482 |
| 1,613,833 | 1/1927 | Jensen | 425—87 |
| 3,526,685 | 9/1970 | Foster et al. | 264—338 |
| 3,247,295 | 4/1966 | Burwell | 264—54 |
| 3,677,681 | 7/1972 | Zippel | 264—40 |
| 3,551,947 | 1/1971 | Jennings | 264—40 |
| 2,764,779 | 10/1956 | Zona | 425—148 |
| 3,663,139 | 5/1972 | Robbins | 425—147 |

DONALD E. CZAJA, Primary Examiner

G. R. MARSHALL, Assistant Examiner

U.S. Cl. X.R.

264—333; 425—148, 447